Sept. 11, 1973  MINORU KURODA  3,758,358
METHOD OF AND APPARATUS FOR MAKING A PADDED
THREE-DIMENSIONAL APPLIQUE
Original Filed Jan. 21, 1969  3 Sheets-Sheet 1

INVENTOR
MINORU KURODA
BY
ATTORNEY

United States Patent Office 3,758,358
Patented Sept. 11, 1973

3,758,358
METHOD OF AND APPARATUS FOR MAKING A PADDED THREE-DIMENSIONAL APPLIQUE
Minoru Kuroda, Amagasaki-shi, Hyogoken, Japan, assignor to Nishizawa Shoji Co., Ltd., Osaka, Japan, and The Dimension Weld International Corporation, New York, N.Y.
Continuation of application Ser. No. 793,929, Jan. 21, 1969, which is a continuation-in-part of application Ser. No. 662,962, Sept. 21, 1967, both now abandoned. This application Feb. 3, 1971, Ser. No. 112,404
Claims priority, application Japan, Dec. 19, 1966, 41/115,532
Int. Cl. B32b 31/00, 31/18, 31/20
U.S. Cl. 156—222
8 Claims

ABSTRACT OF THE DISCLOSURE

A method of making a three-dimensional foam-filled applique and an apparatus for carrying out the method. A layer of synthetic plastic foam material having an exposed surface of predetermined appearance is placed onto a support. A layer of sheet material portions of which may be light-transmissive, is superimposed upon the exposed surface of the foam material. At least one of the materials is latently adhesive. At least the layers are severed inwardly of the edges along the contour line of the desired applique. Simultaneously the layer of sheet material is pressed against the support at least along a narrow zone inwardly of the contour line and the latently adhesive material is activated to thereby adhere the sheet material in the narrow zone to the support across the layer of foam material.

CROSS REFERENCE TO RELATED APPLICATIONS

This application is a continuation of application Ser. No. 793,929, filed Jan. 21, 1969, now abandoned, which was a continuation-in-part of application Ser. No. 662,-962, filed Sept. 21, 1967, now abandoned.

BACKGROUND OF THE INVENTION

The present invention relates generally to applique articles, and more particularly to three-dimensional foam-filled resilient applique articles. Still more specifically, the invention relates to a method of making such an applique article and to an apparatus for carrying out the method.

In my aforementioned copending application, I have already disclosed a three-dimensional foam-filled resilient applique article. According to that disclosure a layer of synthetic plastic foam material is placed onto a support, a layer of sheet material is superimposed upon the foam material, with at least one of these materials being latently adhesive. The layers are severed inwardly of their edges along the contour line of the desired applique and the layer of sheet material is pressed at least along a narrow zone inwardly of the contour line against the support while at the same time the latently adhesive material is activated to thereby adhere the layer of sheet material in the narrow zone to the support across the intervening portions of the layer of foam material.

I have not, however, disclosed in my aforementioned copending application that I am able to provide particular effects in my novel applique article which are herein to be described, and where I have disclosed in detail an apparatus for carrying out my method.

SUMMARY OF THE INVENTION

It is, accordingly, a general object of my invention to provide improvements in the method and apparatus for making an applique article of the type disclosed in my aforementioned copending application.

A more specific object of my invention is to provide a method of making such an applique which permits a much wider range of visual differences in appliques so made.

An additional object of my invention is to provide a method of making an applique of the type here under discussion wherein the applique can be applied to a support even if the latter is of rather tenuous nature.

A further object of my invention is to provide an apparatus for carrying out my method.

In accordance with one feature of my invention, and in pursuance of the above objects and others which will become apparent hereafter, I provide a method of applying an applique to a support, which method comprises the steps of placing onto a support a layer of synthetic plastic foam material having an exposed surface of predetermined appearance, and superimposing upon the exposed surface a layer of sheet material at least portions of which are light-transmissive. At least one of these materials is latently adhesive. Thereupon at least the layers are severed inwardly of the edges thereof along the contour line of the desired applique and the layer of sheet material is pressed against the support at least along a narrow zone inwardly of the contour line while the latently adhesive material is simultaneously activated. Thereby I adhere the layer of sheet material to the narrow zone to the support across the intervening portions of foam material so that I provide on the support a three-dimensional foam-filled resilient applique the light-transmissive portions of whose layer of sheet material permit visual observation of underlying portions of the exposed surface of the layer of foam material.

In accordance with a further feature of my invention an apparatus for carrying out my method comprises a support means for supporting a laminar assembly which includes a layer of synthetic foam material sandwiched between an upper and lower layer of sheet material with at least one of the materials being latently adhesive. Operating means is located above the support means and includes means for severing at least the upper layer and the layer of foam material inwardly of the edges thereof along the contour line of an applique which is to be produced. Finally, I provide actuating means for simultaneously pressing the layers against one another at least along a narrow zone inwardly of the contour line, and for also activating the latently adhesive material to thereby adhere the layers of sheet material in the narrow zone to one another across the layer of foam material and to produce a resilient three-dimensional foam-filled applique.

It will be appreciated that if the layer of sheet material is at least in part light-transmissive this may be obtained either by having it be partially opaque and partially transparent and translucent, or it may simply be obtained by providing cut-outs. In either case, the surface of the layer of foam material which is visable through the light-transmissive portions of the layer of sheet material may be either completely smooth or porous, or it could be sculptured, which is to say that it may be provided with a design in shallow relief. Furthermore, it may have one or different colors and it may be provided with printing or otherwise fixed portions of a design which are to be visable through the light-transmissive portions of the layer of sheet material and which may complement a design provided on the remaining portions of the sheet material and/or on the light-transmissive portions insofar as these are not constituted by cut-outs.

According to a further feature of my invention, I may provide a layer of backing material on the side of the support opposite that on which the synthetic plastic foam material and the sheet material are located. A layer of backing material will be advantageous when the support itself is lacking in strength, for instance if the support is a very thin fine fabric the layer of foam material will then be adhered to the support along the same lines on the other side of the support along which the foam material and the layer of sheet material are adhered to the support on the front thereof. If the layer of sheet material is made of a synthetic plastic waterproof material, such as thin vinyl, it will serve not only to reinforce the support but also to prevent the entry of moisture through the support into the layer of synthetic plastic foam material.

While in the specification and claims I have mentioned a layer of "synthetic plastic foam material," I wish it expressly understood that other types of resiliently compressible filler or padding material may be substituted, including such natural-fiber materials as cotton padding and such synthetic fiber materials as Dynel (TM) padding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
FIG. 1 is a somewhat diagrammatic plan view illustrating an applique applied to a support according to one embodiment of my invention.
Figure 2:
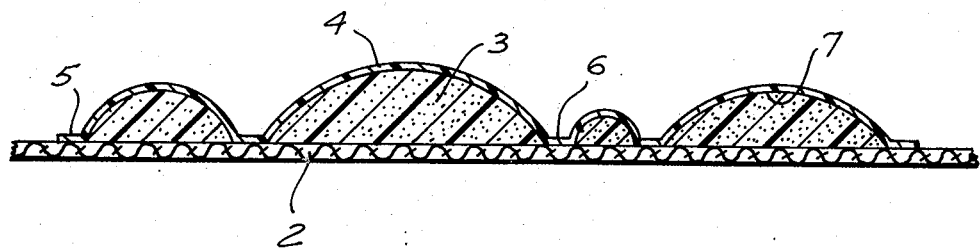
FIG. 2 is a section taken on the line II—II of FIG. 1.

Discussing now the drawing in detail, and firstly FIGS. 1 and 2 thereof, it will be seen that in FIG. 1 I have illustrated the applique generally with reference numer 1. This reference numeral designates the support 2 as well as the actual applique carried thereby. The support 2 is in the illustrated embodiment assumed to be a textile material, as evident from the shading in FIG. 1 and from the cross section in FIG. 2. However, it could be also another suitable material, for instance a synthetic plastic.

A layer 3 of synthetic plastic foam material is superimposed upon the support 2 and a layer 4 of sheet material is superimposed upon the exposed surface of the layer 3. Thereupon, the layers 3 and 4 are severed inwardly of their edges along the contour line of the desired applique, which here is in form of a fawn. Now, the layer 4 is adhered to the support 2 across the intervening portions of the foam layer 3 along a narrow zone 5 which is located inwardly of and follows the contour line of the design as well as outwardly surrounding the predetermined area of the applique being formed, as well as along narrow zones 6 located within the zones 5 and outlining inner details of the design, namely the fawn. How this is done, and the fact that in this embodiment the material of the layer 3 which is latently adhesive and which collapses when the layer 4 is contacted under pressure and heat so as to bond the layer 4 along the narrow zones 5 and 6 to the support 2, I have discussed in my aforementioned copending application. It will be appreciated that it would also be possible instead of adhering the layer 4 to the support 2 across the layer 3 along the narrow zones 5 and 6, to adhere it to the layer 2 along the zones where in FIG. 2 it is not now adhered, and to leave zones corresponding to the zones 5 and 6 extend upwardly in form of raised foam-filled ridges. This is simply a reversal and is of course encompassed within the inventive concept. Of course the areas of the layers 3 and 4 are smaller than that of the layer 2, but longer than that of the applique surrounded by the zone 5.

In the illustrated embodiment the layer 4 is completely light-transmissive as indicated by the fact that the porous of the material of layer 3 are visible in FIG. 1. The only exception is the butterfly perching on the rump of the fawn, it being clear from FIG. 1 and the absence of the showing of the porous that the butterfly-portion of the layer 4 is opaque and, as shown, is provided with printing or other means showing the details of the butterfly, namely circles and scallops. Additional details of the fawn design, such as the eye and the like, may be provided either on the exposed surface of the layer 4, on the concealed surface of the layer 4, or on the surface 7 of the layer 3. In the illustrated embodiment it is assumed that they are provided on the surface 7 and it is clear that they may be printed, painted, or provided in any other way deemed suitable.

Figure 3:
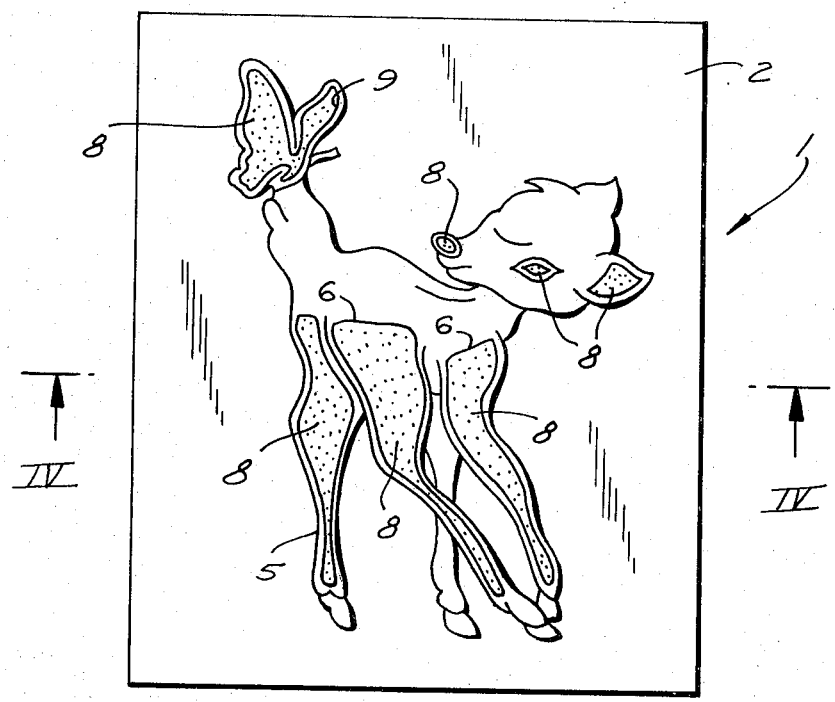
FIG. 3 is a view similar to that of FIG. 1 but illustrating a somewhat different design and a further embodiment of the invention.
Figure 4:
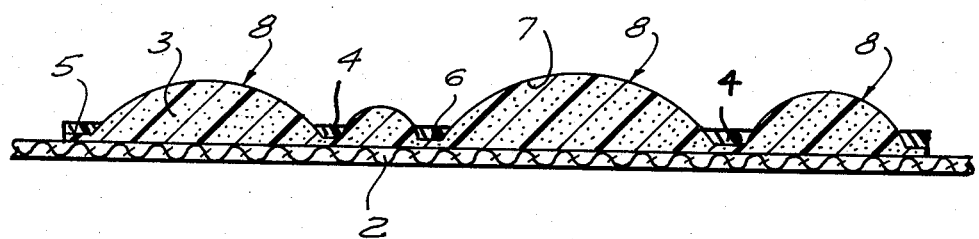
FIG. 4 is a section taken on the line IV—IV of FIG. 3.

The embodiment illustrated in FIGS. 3 and 4 differs from that of FIG. 1 in certain respects. Identical elements are again identified with the same reference numerals as in FIGS. 1 and 2. In FIG. 3, however, it is assumed and illustrated that some portions of the layer 4 are opaque whereas the remaining portions, identified with reference numeral 8, are light-transmissive by virtue of the fact that they are cut-out. The cut-outs 8 will be either coextensive with the zones 5 and 6, or they would extend at most slightly inwardly beyond these zones so that the layer 4 can nowhere become separated from the layer 3. The borders of the cut-outs are identified with reference numeral 9. It will be evident again that the surface of the layer 3 insofar as it is exposed may be of color different from that of the opaque part of the layer 4, that it may be sculptured in the sense discussed earlier, that it may be smooth, that it may be porous, that it may be provided with a print of otherwise light design, or the like. Similarly, the opaque portion of the layer 4 may be simply one or more colors, where it may itself be provided with a design or part thereof.

Although I have not illustrated, I wish to emphasize that it is completely possible to interpose an additional layer of sheet material between the layer 3 and the layer 4. In this case the additional layer could have certain portions either cut-out or light-transmissive so as to make the surface of the layer 3 visable therethrough, and other portions of the layer 4—in addition to those registering the portions through which the exposed parts of the layer 3 can be viewed—could themselves be cut-out or light-transmissive so as to show underlying portions of the additional layer which may carry a design or a different color. Evidently, any modifications arising from this concept are intended to be encompassed within my inventive intent.

Figure 5:
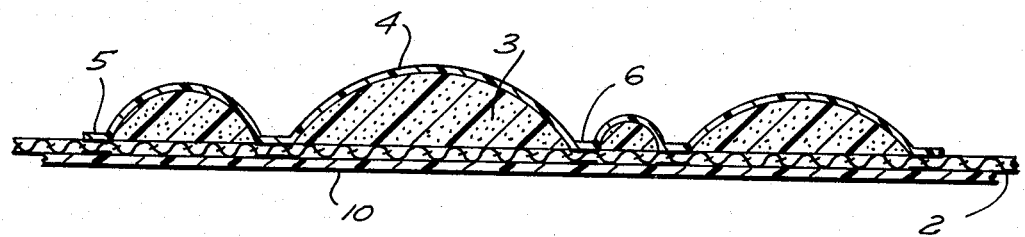
FIG. 5 is a section analogous to the one shown in FIG. 4 but illustrative of yet a further embodiment of the invention.

Coming now to the embodiment of FIG. 5, it will be seen that this corresponds substantially to that of FIGS. 1 and 2. Identical elements are again identified with identical reference numerals. In FIG. 5, however, it is assumed that the support 2 consists of material having a low strength and/or that it is desired to prevent the intrusion of moisture through the support 2 into the layer 3. In either case I provide a backing layer 10 of advantageously synthetic plastic material, such as vinyl, and in the latter case the backing layer will of course be waterproof if it is continuous as normally intended. When the layer 4 is adhered to the support 2 in the manner discussed earlier, and along the narrow zones 5 and 6, the layer 10 will simultaneously be adhered to the support 2 at the other side thereof and also along the narrow zones 5 and 6. This is clearly illustrated and it will be appreciated that it may result either from activation of latently adhesive tendencies of the layer 10 during adhering of the layer 4 to the support 2, or from penetration of the collapsed portions of the layer 3 in the regions of the zones 5 and 6 through the material of the support 2—if the material is of such a nature as to permit such penetration—and bonding with the corresponding zones of the layer 10. The narrow zone 5 is of course peripherally complete, outlining the applique, so that the intrusion of moisture from the rear of the support 2 into the layer 2 is precluded by the provision of the backing layer 10. Of course, the layer 10 need not consist of synthetic plastic material and need not be waterproof if it is required only for reinforcing purposes. In fact, such portions of the layer 10 as are located intermediate the portions adhered to the support 2 in the narrow zones 5 and 6 may be removed in suitable well-known manner if the layer was intended only for reinforcement purposes.

Figure 6:
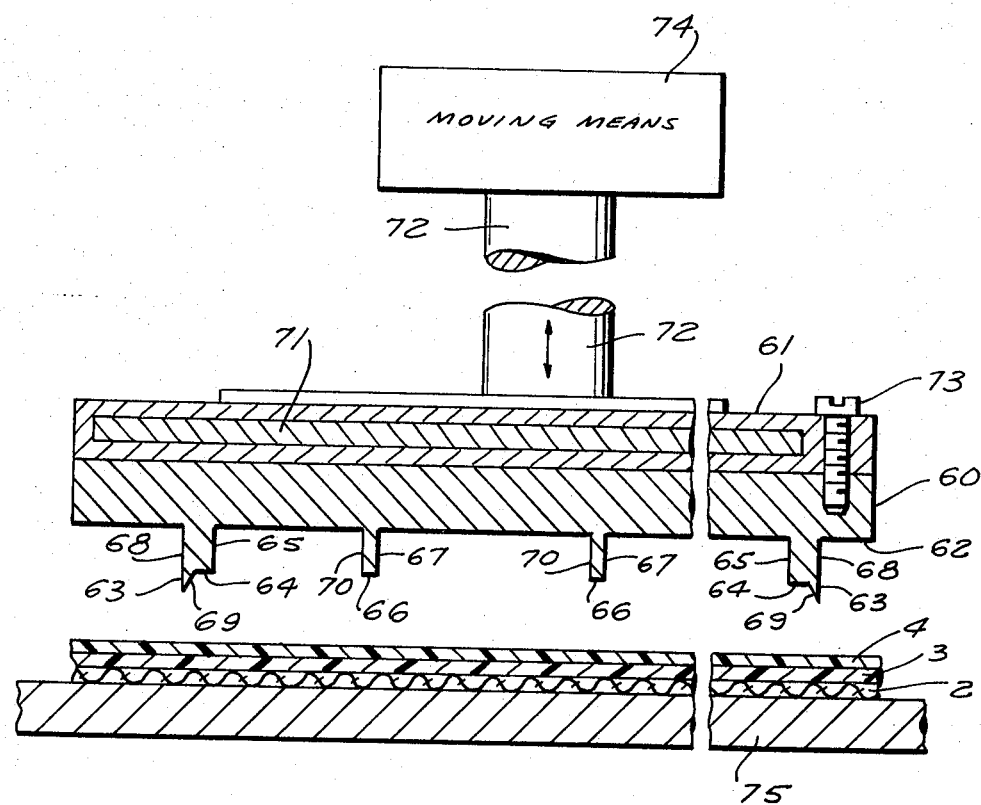
FIG. 6 illustrates in somewhat diagrammatic form an apparatus for carrying out my novel method.

Coming, finally, to FIG. 6 it will be seen that I have therein somewhat diagrammatically illustrated an apparatus for carrying out my novel method. Reference numeral 60 identifies a mold platen to which a heating platen 61 of known construction is connected by means of screws 73 or analogous elements. The construction of the heating platen 61 need not be further described because it can be conventional, as can be the manner of supplying heat thereto, for instance the platen 61 may be electrically heated and connected with a source of electric energy.

The underface or downwardly directed face 62 of the mold platen 60 is provided with a downwardly extending projection 65 having a sharp edge 63 and, located above the edge 63, a flat face 64. A substantially vertical edge face 68 extends upwardly from the sharp edge 63 to the underface 62 of the mold platen 60. An inclined edge face 69 extends from the sharp edge 63 to the flat face 64. I wish to point out that the distance between the lowermost point of the sharp edge 63 and the flat face 64 should preferably be smaller than the combined thickness of the layers 3 and 4 which are located on the support 2 which in turn rests on a work table or the like 75. The width of the flat face 64 as seen in a plane parallel to the general plane of the under face 62, may advantageously be great enough so as to cover at least a portion of the outer contour line of the applique which it is desired to produce.

Located within the projections 65 are projection 67 having flat edge faces 66 and substantially vertical side faces 70. It will be appreciated that the flat faces 64 provide in operation of the apparatus the narrow zones of connection identified with reference numeral 5 in the preceding figures, and that the edge faces 66 provide the narrow zones which are identified in the preceding figures with reference numeral 6. It should be noted that the general plane of the edge faces 66 is located upwardly of the lowermost point of the sharp edges 63, and in the illustrated embodiment is shown to coincide with the general planes of the flat faces 64. The connecting member 72, here illustrated as being rod-shaped, connects the mold consisting of the joined platens 60 and 61, with a suitable moving means 74, the arrow associated with the member 72 indicating by its double-headed configuration that the moving means is operative for moving the mold downwardly towards the worktable 75 as well as upwardly away therefrom, the latter two permitting removal of the completed applique.

It will be appreciated that when the mold is moved downwardly towards an assembly as illustrated on the work table 75 and consisting of the support 2, the foam layer 3 and the layer of sheet material 4, the sharp edges 63 will initially sever at least the layers 4 and 3 and may also sever the support 2 if the distance between the lowermost point of the respective sharp edges and the flat faces 64 are such as to permit this. The flat faces 64 and 66 simultaneously press portions of corresponding width of the layer 4 against the layer 3 and thereby against the support 2. Of course, the platen 60 and thereby its projections 65 and 67, are heated by the heating platen 61 and contact of the faces 64 and 66 with the layer 4 serves to transmit heat therethrough to the layer 3 which collapses a zone corresponding substantially to the width of the faces 64 and 66 and serves to adhere the layer to the support 2 in these zones.

The apparatus shown in FIG. 6 has been illustrated only diagrammatically and modifications are possible and are intended to be encompassed within the concept of the present invention.

It will be understood that each of the elements described above, or two or more together, may also find a useful application in other types of applications differing from the types described above.

While the invention has been illustrated and described as embodied in a three-dimensional foam-filled resilient applique, it is not intended to be limited to the details shown, since various modifications and structural changes may be made without departing in any way from the spirit of the present invention.

What is claimed as new and desired to be protected by Letters Patent is set forth in the appended claims:

1. A method of making a three-dimensional applique having a predetermined applique area, comprising the first step of placing onto a support material having a predetermined outline surrounding a predetermined area, a filler sheet of resiliently compressible filler material having an exposed surface and an outline spaced inwardly of and different from said predetermined outline and surrounding an area substantially smaller than said predetermined area but larger than said predetermined applique area; the second step of superimposing upon said exposed surface for said filler sheet a cover sheet of sheet material also having an outline spaced inwardly of and different from said preedtermined outline and surrounding an area substantially smaller than said predetermined area but larger than said predetermined applique area, at least portions of said cover sheet being at least translucent within that part thereof which overlies said predetermined applique area and at least one of said materials being latently adhesive; the third step of pressing said cover sheet against said filler sheet and said support material at least along a narrow marginal zone surrounding said applique area while activating said latently adhesive material so as to compress said filler material and bond said cover sheet to said support material along said predetermined applique area; removing that portion of said filler sheet and of said cover sheet located outside of said predetermined applique area while simultaneously positively severing at least said sheets outwardly along said narrow marginal zone, thereby forming a three-dimensional padded resilient applique the translucent portions of whose cover sheet permit visual observation of underlying portions of said exposed surface of said filler sheet.

2. A method as defined in claim 1, wherein juxtaposed major surface portions of said materials are unconnected with one another and movable with reference to each other.

3. A method as defined in claim 1, wherein said resiliently compressible filler material is a synthetic thermoplastic foam material; and wherein the step of bonding comprises subjecting said thermoplastic foam material in said narrow marginal zone to heat requisite for effecting at least partial melting of said thermoplastic foam material.

4. A method as defined in claim 3, wherein said third step also comprises causing said thermoplastic foam material to bond said cover sheet to said support material in narrow areas bounding the respective translucent portions.

5. A method as defined in claim 3, wherein at least one of said sheet material and said support material is a textile material; and wherein said third step comprises causing said thermoplastic foam material in said narrow marginal zone to at least partially melt and penetrate into said textile material for bonding with the same.

6. A method as defined in claim 3, and further comprising the step of interposing an intermediate layer of sheet material between said cover sheet and said filler sheet prior to carrying out said third step, so that the portions of said layer which register with said translucent portions are visually observable through the latter.

7. A method as defined in claim 5, wherein said support material is said textile material.

8. A method as defined in claim 5, wherein said sheet material of said cover layer is said textile material.

References Cited

UNITED STATES PATENTS

| | | | |
|---|---|---|---|
| 3,560,321 | 2/1971 | Magid | 161—119 |
| 3,244,571 | 4/1966 | Weisman | 156—196 |
| 2,729,009 | 1/1956 | Markus et al. | 156—219 |
| 2,710,046 | 6/1955 | Markus et al. | 156—221 |
| 3,563,827 | 2/1971 | Zylinski | 156—209 |
| 2,987,103 | 6/1961 | Yakubik | 161—6 |
| 2,931,202 | 4/1960 | Messerli | 161—109 X |
| 3,257,263 | 6/1966 | Miller | 161—119 |

ALFRED L. LEAVITT, Primary Examiner

B. J. LEWRIS, Assistant Examiner

U.S. Cl. X.R.

156—196, 210, 220, 251, 267, 309, 443, 515; 161—6, 119, 124